US009981459B2

(12) United States Patent
Gibson et al.

(10) Patent No.: US 9,981,459 B2
(45) Date of Patent: May 29, 2018

(54) LAYERED INFRARED TRANSMITTING OPTICAL ELEMENTS AND METHOD FOR MAKING SAME

(71) Applicants: Daniel J. Gibson, Cheverly, MD (US); Mikhail Kotov, Silver Spring, MD (US); Geoff Chin, Arlington, VA (US); Shyam S. Bayya, Ashburn, VA (US); Jasbinder S. Sanghera, Ashburn, VA (US)

(72) Inventors: Daniel J. Gibson, Cheverly, MD (US); Mikhail Kotov, Silver Spring, MD (US); Geoff Chin, Arlington, VA (US); Shyam S. Bayya, Ashburn, VA (US); Jasbinder S. Sanghera, Ashburn, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1051 days.

(21) Appl. No.: 14/210,828

(22) Filed: Mar. 14, 2014

(65) Prior Publication Data

US 2016/0375669 A1 Dec. 29, 2016

Related U.S. Application Data

(60) Provisional application No. 61/787,365, filed on Mar. 15, 2013.

(51) Int. Cl.
*B32B 37/10* (2006.01)
*B32B 17/06* (2006.01)
(Continued)

(52) U.S. Cl.
CPC .......... *B32B 37/1009* (2013.01); *B32B 17/06* (2013.01); *B32B 33/00* (2013.01);
(Continued)

(58) Field of Classification Search
CPC . B32B 37/10; B32B 37/1009; B32B 37/1027; G02B 13/14; G02B 5/208
See application file for complete search history.

(56) References Cited

U.S. PATENT DOCUMENTS 4,929,065 A 5/1990 Hagerty et al.
5,735,927 A 4/1998 Sanghera et al.
(Continued)

OTHER PUBLICATIONS

Beadie et al., "Optical properties of a bio-inspired gradient refractive index polymer lens," Optics Express, vol. 16, No. 15, 11540-47 (2008).

*Primary Examiner* — Lisa L Herring
(74) *Attorney, Agent, or Firm* — US Naval Research Laboratory; Rebecca L. Forman (57) ABSTRACT

A method for bonding infrared transmitting glasses into an optical element without interlayer voids by stacking at least two different infrared transmitting glasses inside a vessel where each glass has a different refractive index, a different dispersion, or both, and where the glasses all have similar viscosities, thermal expansion coefficients, and glass transition temperatures; placing a weight on top of the stack; applying a vacuum to the vessel; applying an isostatic pressure of at least 1500 psi; and after releasing the isostatic pressure, annealing at a temperature within 10° C. of the glass transition temperature at a pressure between 0 and 1000 psi. Applying the vacuum, applying the isostatic pressure, and annealing are done sequentially and with no intermediate transitions to ambient temperature or pressure. Also disclosed is the related optical element made by this method.

20 Claims, 5 Drawing Sheets

(51) Int. Cl.
*B32B 37/18* (2006.01)
*B32B 38/00* (2006.01)
*B32B 33/00* (2006.01)
*B32B 37/00* (2006.01)
*B32B 37/14* (2006.01)
*B32B 37/26* (2006.01)

(52) U.S. Cl.
CPC ........ *B32B 37/0007* (2013.01); *B32B 37/003* (2013.01); *B32B 37/1018* (2013.01); *B32B 37/144* (2013.01); *B32B 37/18* (2013.01); *B32B 38/0036* (2013.01); *B32B 2037/0092* (2013.01); *B32B 2037/268* (2013.01); *B32B 2038/0048* (2013.01); *B32B 2307/412* (2013.01); *B32B 2307/418* (2013.01); *B32B 2309/022* (2013.01); *B32B 2309/125* (2013.01); *B32B 2309/62* (2013.01); *B32B 2309/68* (2013.01); *B32B 2315/08* (2013.01); *B32B 2551/00* (2013.01)

(56) References Cited

U.S. PATENT DOCUMENTS

| | | | | |
|---|---|---|---|---|
| 5,769,986 | A * | 6/1998 | Hagedorn | B29C 66/73111 156/285 |
| 5,779,757 | A * | 7/1998 | Sanghera | C03B 5/225 423/508 |
| 6,347,536 | B1 * | 2/2002 | Calderini | C03B 11/082 264/1.1 |
| 7,002,754 | B2 | 2/2006 | Baer et al. | |
| 2005/0257877 | A1 * | 11/2005 | Stark | B32B 37/00 156/182 |
| 2006/0233512 | A1 * | 10/2006 | Aitken | C03C 3/321 385/147 |
| 2007/0029365 | A1 * | 2/2007 | Paul | B32B 37/10 228/101 |
| 2012/0206796 | A1 * | 8/2012 | Gibson | C03B 23/0006 359/356 |
| 2016/0377845 | A1 | 12/2016 | Gibson et al. | |

* cited by examiner

LAYERED INFRARED TRANSMITTING OPTICAL ELEMENTS AND METHOD FOR MAKING SAME

PRIORITY CLAIM

The present application is a non-provisional application claiming the benefit of U.S. Provisional Application No. 61/787,365, filed on Mar. 15, 2013 by Dan J. Gibson et al., entitled "Layered Infrared Transmitting Optical Elements and Method for Making Same," the entire contents of which is incorporated herein by reference.

BACKGROUND OF THE INVENTION

Field of the Invention

This disclosure pertains to the field of infrared optics and, more specifically, to infrared lens elements and multi-element infrared imaging lens systems.

Description of the Prior Art

It is common to refer to an optical glass as having a refractive index at a certain wavelength and to describe the shape of the dispersion function using the Abbe number, V (or $\nu$)=$(n_d-1)/(n_F-n_C)$, and various partial dispersion values, $P_{x,y}=(n_x-n_y)/(n_F-n_C)$, as dictated by the precision of the optical design. Since infrared transmitting glasses often have poor transmission for visible wavelengths, a 'modified' Abbe number is used where the visible wavelengths, $\lambda_F$, $\lambda_d$, and $\lambda_C$, are replaced with more suitable infrared wavelengths. Two common examples are the mid-wave infrared (MWIR), where the wavelengths 3, 4 and 5 µm are used and the long-wave infrared (LWIR) where the wavelengths 8, 10 and 12 µm are used to define the MWIR dispersion, $V_{(3-5)}$ (or $V_{MWIR}$)=$(n_4-1)/(n_3-n_5)$ and LWIR dispersion, $V_{(8-12)}$ or $(V_{LWR})=(n_{10}-1)/(n_8-n_{12})$ respectively. While these dispersion parameters describe the wavelength dependent refractive index of IR-transmitting materials sufficiently to aid the selection of materials for a lens design, they lack the precision required for modern high performance optical design software. As a result, the refractive index is also represented in either tabular form (a list of indices at specific wavelengths) or more precisely by Sellmeier coefficients that permit interpolation and extrapolation of refractive index values.

Refractive optical imaging systems typically utilize multiple refractive optical elements to manipulate light and create an image. Commonly, these individual optical elements are comprised of different optical materials with different optical properties, including refractive indices, dispersions, or thermo-optic coefficients, in such combinations that attempt to reduce or eliminate problems associated with using a single material, including for example chromatic dispersion and thermal drift. For various reasons, including reducing system size, weight and complexity or improving performance and reliability, optical designers can use specialized optical elements, for example achromatic doublets or gradient index (GRIN) optics. Achromatic doublets and triplets are comprised of separate optical elements of dissimilar materials, with different optical properties that have been bonded to each other using transparent adhesives. This is a common practice for visible imaging systems, but the lack of suitable IR-transparent optical cements limits application of this technology to IR optical elements. GRIN optics are single optical elements wherein the optical properties vary in a controlled way within the bulk of the optical element. GRIN optics are also limited to primarily visible wavelengths as the methods used in their fabrication are not well-suited to IR transparent materials. The majority of GRIN optics are fabricated using an ion-exchange process wherein the optical element is submerged in a hot salt bath for an extended time such that the ions in the element diffuse through the element into the bath and ions from the bath diffuse into the element, imparting a compositional concentration gradient and thereby a gradient in the optical properties of the optical element. This process is typically not possible with IR transparent materials, especially those used beyond 2 µm. Furthermore, the thermodynamics of diffusion limit the size of optical elements fabricated via the method under reasonable times to about 1 inch in diameter.

Layered optical elements have been fabricated with gradient index using polymer sheets (U.S. Pat. No. 7,002,754 to Baer et al. (2006)) which are bonded to one another using pressure (Beadie et al., "Optical properties of a bio-inspired gradient refractive index polymer lens," *Optics Express*, 16, 15, 11540-47 (2008)) and later molded and/or machined. Hagerty et al. describe a method of stacking an assemblage of glass sheets and heating to bond them, using a vacuum pressure of 20-25 inches of mercury (508-635 Torr) to remove trapped air between the sheets and recommend selecting glasses with similar melting and annealing temperatures (U.S. Pat. No. 4,929,065 to Hagerty et al. (1990)). Hagerty et al. acknowledge that "[i]f the plate surfaces are very smooth, however, the use of vacuum seems to have a minimal effect." One skilled in the art would appreciate that the application of their method to infrared glasses would result in the formation of voids at the interfaces, not from trapped air, but rather due to sublimation of volatile species at the softening temperature. Hagerty et al. recommend long heating schedules (1.5 to 8 hours) and sequential zone heating to allow bubbles to settle out of the glasses, which will not work for IR glasses where volatile components outgas further increasing bubble formation.

Sanghera et al. teach a method for fabricating a core/clad fiber optic preform using two infrared transmitting glasses in a nested rod/tube configuration wherein one seals the rod and tube together under vacuum and subsequently applies high isostatic pressure to the assembly to remove trapped porosity (U.S. Pat. No. 5,735,927 to Sanghera et al. (1998)). Sanghera et al. mention that their method could also be applied to "other glass bodies such as lenses, windows, and planar wave guides which are a composite of two glass bodies having a common interface" but (i) do not teach the necessary steps to apply their method successfully to the application of non-concentric geometry, (ii) do not teach the application of uniaxial load to a linear stack of sheets, (iii) do not teach a method with more than two glass bodies, (iv) do not teach a method with more than one interface and (v) teach softening of linearly separated portions of the glass body separately and sequentially to form hermetic sealing of the interfacial area under a vacuum, and a separate hot isostatic pressing step, which require that one skilled in the art would necessarily return the partially bonded body to ambient temperature and pressure prior to transferring it to the hot isostatic pressing vessel.

BRIEF SUMMARY OF THE INVENTION

The aforementioned problems are overcome in the present invention which provides a method for bonding infrared transmitting glasses into an optical element without interlayer voids by stacking at least two different infrared transmitting glasses inside a vessel where each glass has a different refractive index, a different dispersion, or both, and where the glasses all have similar viscosities, thermal expansion coefficients, and glass transition temperatures; placing a weight on top of the stack; applying a vacuum to the vessel; applying an isostatic pressure of at least 1500 psi; and after releasing the isostatic pressure, annealing at a temperature within 10° C. of the glass transition temperature at a pressure between 0 and 1000 psi. Applying the vacuum, applying the isostatic pressure, and annealing are done sequentially and with no intermediate transitions to ambient temperature or pressure. Also disclosed is the related optical element made by this method.

The invention provides a method for bonding infrared transmitting glasses into optical elements with controlled varying internal optical properties (refractive index, dispersion, thermo-optic coefficient, and others) and shaped internal interfaces, without internal voids and without the use of epoxy or glue. The optical elements of this invention will enable infrared optical system engineers to design and build improved imagers with advantages and features previously only available to designers of visible systems. The elements could be used in broad-band infrared imagers, for example achromatic dual-band IR imaging systems, which will reduce the system size, weight and complexity by reducing the number of separate optical elements in imaging systems. System tolerances and costs can be reduced by eliminating the air space between closely spaced elements in lens systems. System performance can be improved as needed by next generation focal plane arrays.

The glasses described herein can be used to make lenses for applications in the SWIR to LWIR regions, represented by 1 to 14 microns wavelength. They can be used for specific wavelength applications such as SWIR (1-2 microns), MWIR (2-5 microns), or LWIR (7-14 microns) or their combinations, and wavelengths in between.

The optical elements of the current invention will replace existing elements in infrared optical system designs with a size, weight and performance advantage. The alternatives to the current invention are already in use in the form of many-element IR imaging lenses, but they are becoming larger, heavier and more complex as IR imaging sensor arrays become smaller and more sensitive.

These and other features and advantages of the invention, as well as the invention itself, will become better understood by reference to the following detailed description, appended claims, and accompanying drawings.

DETAILED DESCRIPTION OF THE INVENTION

The present invention provides layered optical elements for the transmission and manipulation of infrared light, and more specifically infrared lens elements and multi-element infrared imaging lens systems. The described invention is a class of optical elements having a refractive index profile and a dispersion profile and a method for the fabrication of the elements without internal voids. Specifically, the optical elements comprise multiple layers of non-silica, infrared transmitting specialty glasses with different refractive indices and/or dispersions, bonded together without optical cements. The method for making the optical elements avoids the need for optical cements and prevents the formation of inter-layer voids. The optical elements enable lenses that function over a broad wavelength range in the infrared, 800 nm-18 μm, or a portion thereof, depending on the glasses used.

The infrared transmitting optical elements of this invention are comprised of 2 or more layers, wherein each layer comprises infrared transmitting glass, and the layers are bonded together without interlayer voids. The glasses are typically, but not exclusively, chosen from a set of chalcogenide glasses that may comprise one or more of the following elements: S, Se, Te, Ga, Ge, As, Sn, Sb and Ag. Halides such as F, Cl, Br and I can also be added to the glass compositions to make chalcohalide glasses. The glasses comprising each layer have a set of optical properties including a nominal refractive index, a mid-wave dispersion, a long-wave dispersion and a thermo-optic coefficient. The interfaces between the layers, as well as the outer surfaces, may have positive, negative or infinite curvature. The glasses, layer thicknesses and interface profiles are chosen or designed such that the optical properties of the layers are different and complimentary. For example the layers may have different refractive indices to refract light within the optic as in a gradient index (GRIN) lens, or the layers may have different dispersions to correct for chromatic aberrations as in an achromatic lens. Furthermore, the glasses are chosen or designed such that their viscosities and thermal expansion coefficients are similar and they have similar glass transition temperatures (Tg).

Figure 1:
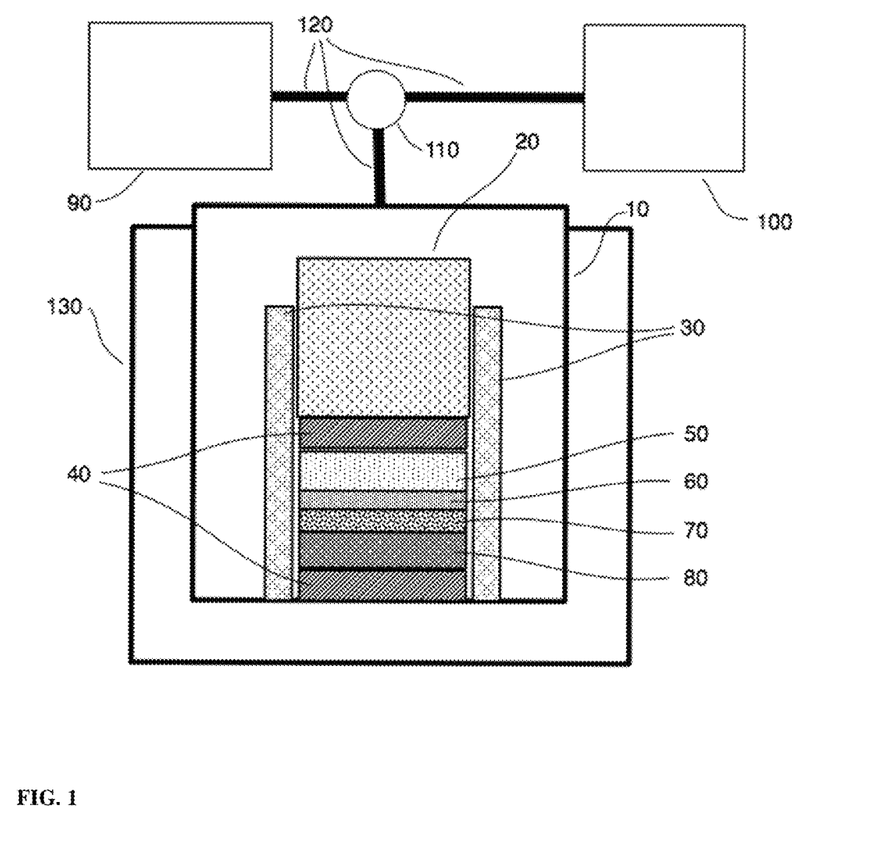
FIG. 1 is a schematic of an apparatus for performing the method of the present invention.
Figure 2:
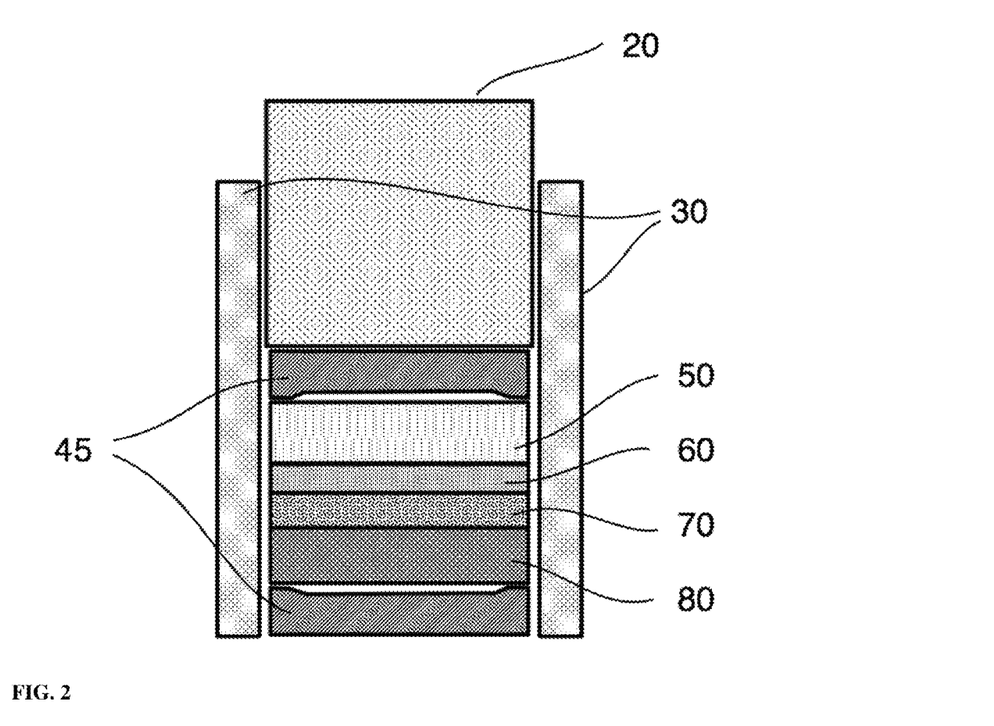
FIG. 2 is a schematic of one embodiment wherein the non-stick plates are shaped to concentrate the uniaxial force from the weight to the perimeter of the glass sheets.

The individual layers within the optical elements comprise sheets of infrared glass and are bonded to each other using both vacuum-pressure and high-pressure sequentially in a single method (see FIG. 1). The individual sheets 50, 60, 70, 80 are cleaned of debris and stacked in an order prescribed by the optical design and the resulting stack is placed between a pair of non-reactive, non-stick plates 40 with a high quality surface finish. The individual sheets comprising the layers are between about 100 μm and 20 mm thick, but could be thicker or thinner, and may have a positive, negative, infinite or some compound curvature, and may substantially resemble a flat disc. The plates can be made from vitreous or glassy carbon, silicon carbide, tungsten carbide, silica glass or another suitable material which is non-reactive to the glass in contact with it. The stack is then placed inside a vessel 10 and a suitable weight 20 typically between 100 and 1000 grams (for a 25 mm diameter, 10 mm thick optical element, but could be more or less as needed) is placed on top of the stack, prior to closing the vessel. In another embodiment of the invention, shown in FIG. 2, one or both of the plates 45 may be shaped to resemble a shallow cup, wherein the center portion is flat and the perimeter is raised, to concentrate the uniaxial load from the weight 20 to the perimeter of the stack of glass sheets. In another embodiment, not shown, one or both of the plates are replaced by rings. A guide sleeve 30 may be used to constrain the lateral movement of the weight, plates and sheets. The vessel is purged with an inert gas and then subjected to vacuum via suitable valves 110 and supply plumbing 120 and heated to a temperature near the glass transition temperature. The vacuum level supplied by the vacuum pump 100 is between about 0.1 and 100 mTorr (but could be higher or lower); the temperature is between Tg−10° C. and Tg+70° C. (but could be higher or lower) and in some embodiments is provided by a furnace 130 that surrounds the vessel. The vacuum is held for a time typically between 10 sec and 60 minutes but could be longer depending on the size of the vessel and parts inside it. After that time, the vessel is slowly filled with an inert gas. The inert gas is typically argon, helium, nitrogen or other suitable gas and may be pre-heated to some temperature at or near the temperature of the glass and vessel prior to entering the vessel. The inert gas inside the vessel is pressurized to a high-pressure between about 1500 psi and 3000 psi using a pump 90. A higher pressure could also be used. The high-pressure is held for a time typically between 5 and 60 minutes but could be longer if needed. The high-pressure is released prior to cooling the vessel below Tg. The temperature is typically held between Tg−10° C. and Tg+10° C. for a time between 20 minutes and 2 hours, with a pressure between 0 psi and 1000 psi to anneal and relieve stress in the bonded glass optical element. The vessel is cooled to room temperature at a rate typically between 0.1 and 20° C./minute.

The optical elements of the present invention and the method to make them are novel and have unique features. The layers in the optical element comprise infrared transmitting glasses, which may be prone to sublimation, decomposition, devitrification or phase separation and therefore require special handling and processing considerations, atypical of glasses used in optics for visible light including silica, silica-based and oxide glasses. The unique features of this method are needed for producing layered infrared optical elements using infrared transparent glasses, and are not typically needed for other materials. Specifically, the method consists of three stages: (i) uniaxial pressure under vacuum, (ii) hot isostatic pressure and (iii) anneal, which are applied sequentially in the same vessel. In the first stage, uniaxial pressure is exerted on the stack of sheets by gravity resulting from the weight above the stack, and the glass stack is exposed to temperatures and vacuum pressure sufficient to cause some sublimation of some chemical elements (for example sulfur) from the glasses. While the first stage is sufficient to mechanically bond the sheets, partial pressure may cause tiny gaps to form between even perfectly flat sheets resulting in trapped porosity at the interfaces. In the second stage, a very high pressure (greater than 1000 psi) is applied isostatically to all sides of the optical element forcing the closure of internal porosity. In the third stage, the optical element is cooled to an annealing temperature and isostatic pressure is reduced to remove internal stress that may have been imposed by the earlier stages.

Figure 3:
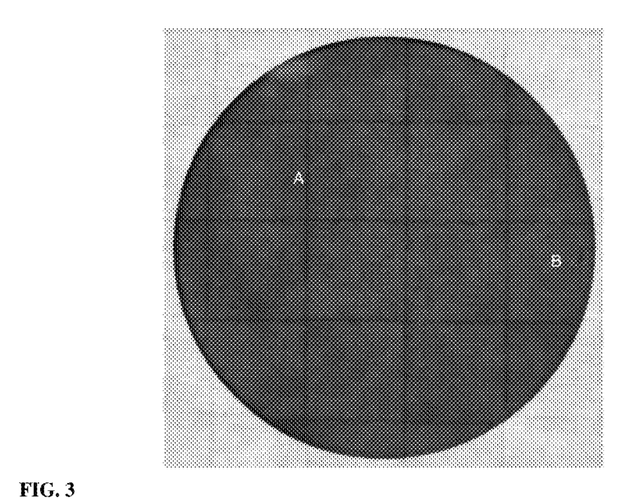
FIG. 3 shows an IR-transmitting two-layered optical element fabricated by uniaxial hot pressing, with a return to ambient temperature before the isostatic pressure step at elevated temperature. Regions A and B show voids at the interface between the two layers and highlight the need for the method of the present invention.

The execution of the three stages, sequentially and without intermediate transitions to ambient temperature or pressure, is a unique requirement to the infrared glasses of the invention and is a unique feature of the method. For example, if one were to perform the stages of the method separately, returning to ambient temperature and pressure between each stage, reheating of the optical element at the start of the second stage could cause trapped porosity to grow beyond a size that can be removed using isostatic pressure as is demonstrated by the IR-transmitting two-layer optical element in FIG. 3, where 2 large interstitial voids are visible and marked as A and B.

In some embodiments, the sheets are substantially flat, infinite curvature, prior to bonding. The surface figures of the sheets are very important, as any imperfections are opportunities for trapped interstitial voids. For example, the sheets should have surface flatness <0.23 wave, surface roughness <17 Angstrom and parallelism <1.9 arc sec or thereabouts. In other embodiments, the sheets have a slight convex curvature on at least one face, such that adjacent sheets contact each other only at the center. This arrangement allows any potential interstitial voids to be eliminated as the interfacial gap closes during the bonding process and results in a layered optical element with substantially flat interfaces. In other embodiments, the sheets have substantial curvature prior to bonding and the curvature between adjacent sheets is matched to permit nesting during the method, and the resultant optical elements will have curved internal and or external interfaces.

In some embodiments, the optical elements are slumped or molded after the method to impart curvature to the internal interfaces. In some embodiments the faces of the optical elements are machined using, for example, single-point diamond turning or other grinding and polishing methods, to impart positive, negative, infinite or compound curvature to one or two faces.

EXAMPLES

Example 1

Figure 4:
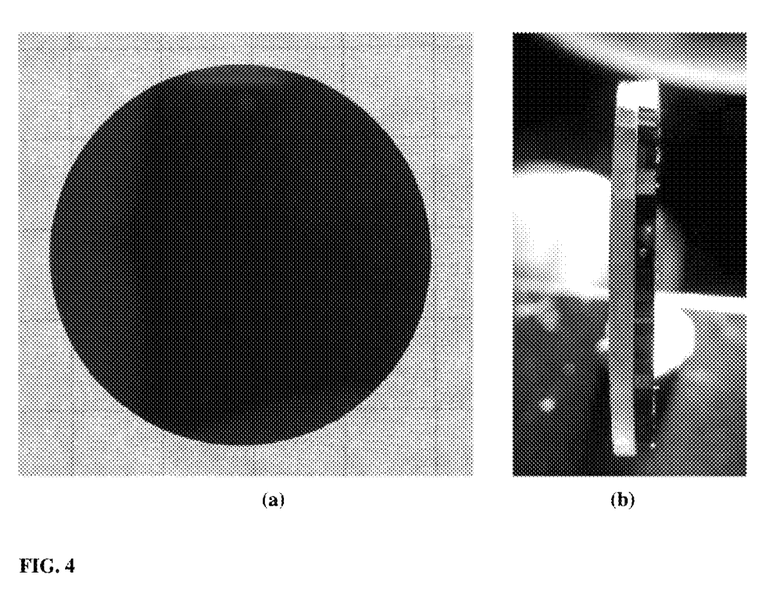
FIG. 4 shows a two-layered IR transparent optical element (a) face view and (b) edge view.

An IR-transparent optical element with two layers was fabricated using the method of the present invention and is shown in FIG. 4. The element comprises two IR-transmitting glasses and has a diameter of 25 mm and a total thickness of 2.0 mm. One layer (top layer in the top view image and left layer in the side-view image) comprises $As_{39}S_{61}$ glass and is 1.0 mm thick; the other layer (bottom layer in the top view image and right layer in the side-view image) comprises $As_{39}S_{46}Se_{15}$ glass and is 1.0 mm thick.

Example 2

Figure 5:
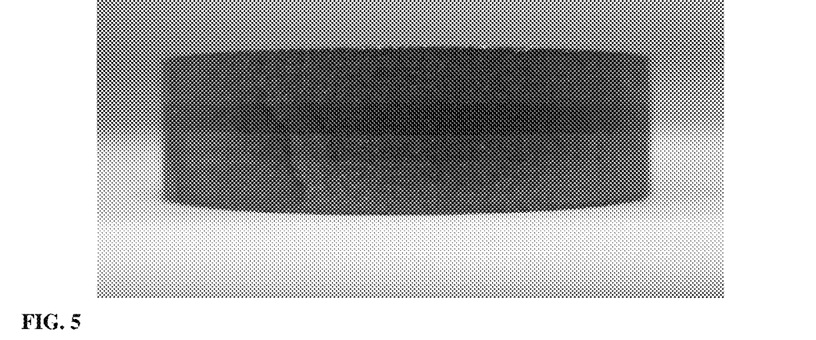
FIG. 5 shows a side view of a four-layered IR transparent optical element.
Figure 6:
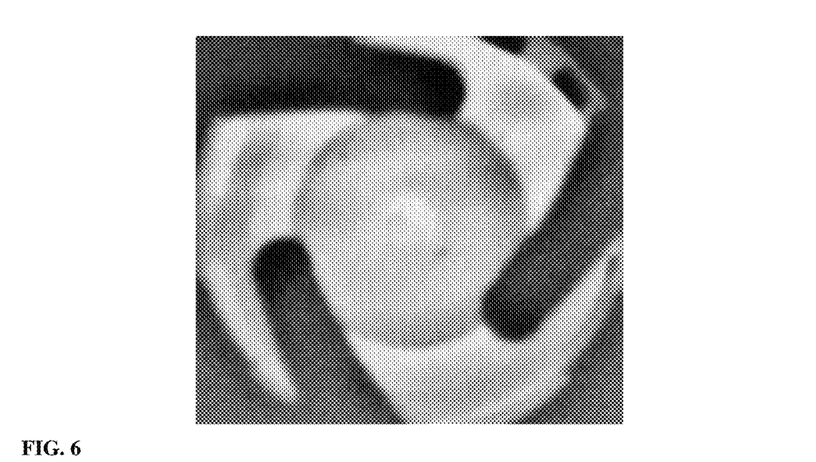
FIG. 6 is an infrared image of a four-layered IR transparent optical element.

An IR-transparent optical element with four layers was fabricated using the method of the present invention, and its profile is shown in FIG. 5. The element comprises o four IR-transmitting glasses and has a diameter of 25 mm and a total thickness of 6.1 mm. The top layer is 2.0 mm thick and comprises an As—S based glass; the second layer is 1.0 mm thick and comprises a Ge—As—S—Te based glass; the third layer is 1.0 mm thick and comprises a Ge—As—Se based glass; and the bottom layer is 2.1 mm thick and comprises a Ge—As—Se—Te based glass. Since the element is opaque to visible light, a long-wave infrared (LWIR) camera was used to look through the optical element. As shown in FIG. 6, the infrared image demonstrates a lack of interstitial voids within the optical element. The bright spot in the center of the image is the hot filament of the illuminating light behind the optic.

Example 3

Figure 7:
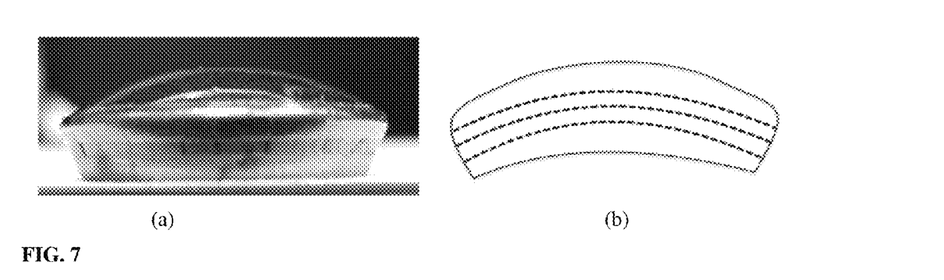
FIG. 7 shows an IR-transparent four-layer optical element with curved internal interfaces and surfaces: (a) side-view photo and (b) sketch of internal interfaces.

An IR-transparent optical element with four layers fabricated using the method of the present invention was then subsequently molded into a lens shape as shown in FIG. 7. The optical element comprises four IR transparent glasses: (i) the top layer comprises an As—S based glass; (ii) the second layer comprises a Ge—As—S—Te based glass; (iii) the third layer comprises Ge—As—Se based glass; and (iv) the bottom layer comprises a Ge—As—Se—Te based glass. FIG. 7(a) shows a side view of the curved IR-transparent four-layer optical element with curved internal interfaces and surfaces. A sketch of the internal interfaces is shown in FIG. 7(b).

Example 4

Figure 8:
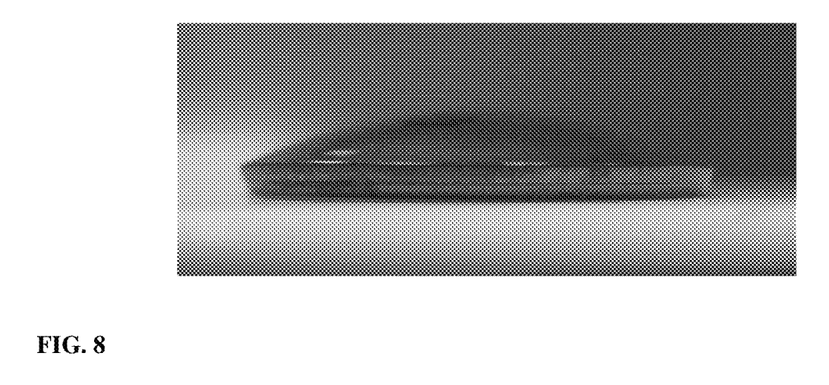
FIG. 8 shows an IR-transparent two-layer optical element with curved surfaces and a curved internal interface. The total center thickness is 1.54 mm, the total height is 4.45 mm, and the total diameter is 24.4 mm.

An IR-transparent optical element with two layers fabricated using the method of the present invention was then subsequently slumped into a lens shape as shown in FIG. 8. The optical element comprises two As—S based IR transparent glasses wherein the layer with the convex surface (top layer in FIG. 8) has a larger As/S ratio than the layer with the concave surface (bottom layer in FIG. 8). Each layer has a center thickness of 0.77 mm. The total center thickness of the element is 1.54 mm, the total height is 4.45 mm, and the total diameter is 24.4 mm. The optical element could also be slumped where the thickness of each layer changes after the slumping process.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for bonding infrared transmitting glasses into an optical element without interlayer voids, comprising:
   stacking at least two different infrared transmitting glasses inside a vessel to form a stack of glasses, wherein each glass has a different refractive index, a different dispersion, or both, wherein the at least two different infrared transmitting glasses all have similar viscosities, thermal expansion coefficients, and glass transition temperatures, wherein the stack of glasses is placed between two non-reactive plates, and wherein one or both non-reactive plates have a flat center portion and a raised perimeter or wherein one or both non-reactive plates are in the shape of a ring;
   placing a weight on top of the stack of glasses;
   applying a vacuum to the vessel;
   applying an isostatic pressure of at least 1500 psi; and
   after releasing the isostatic pressure, annealing at a temperature within 10° C. of the glass transition temperature at a pressure between 0 and 1000 psi, wherein applying the vacuum, applying the isostatic pressure, and annealing are done sequentially and with no intermediate transitions to ambient temperature or pressure.

2. The method of claim 1, wherein each glass comprises S, Se, Te, Ga, GeAs, Sn, Sb, Ag, or any combination thereof.

3. The method of claim 1, wherein at least one glass comprises F, Cl, Br, I, or any combination thereof.

4. The method of claim 1, wherein a guide sleeve is used to constrain lateral movement of the stack of glasses.

5. The method of claim 1, wherein the vacuum is between 0.1 and 100 mTorr.

6. The method of claim 1, where the vacuum is held for between 10 seconds and 60 minutes.

7. The method of claim 1, wherein the isostatic pressure is between 1500 and 3000 psi.

8. The method of claim 1, wherein the isostatic pressure is held for between 5 and 60 minutes.

9. The method of claim 1, wherein the annealing is for a time between 20 minutes and 2 hours.

10. The method of claim 1, wherein the at least two different infrared transmitting glasses are substantially flat prior to bonding.

11. The method of claim 1, wherein after bonding the at least two different infrared transmitting glasses are slumped or molded.

12. A method for bonding infrared transmitting glasses into an optical element without interlayer voids, comprising:
   stacking at least two different infrared transmitting glasses inside a vessel to form a stack of glasses, wherein each glass has a different refractive index, a different dispersion, or both, wherein the at least two different infrared transmitting glasses all have similar viscosities, thermal expansion coefficients, and glass transition temperatures, and wherein the at least two different infrared transmitting glasses have a convex curvature on at least one face prior to bonding;
   placing a weight on top of the stack of glasses;
   applying a vacuum to the vessel;
   applying an isostatic pressure of at least 1500 psi; and
   after releasing the isostatic pressure, annealing at a temperature within 10° C. of the glass transition temperature at a pressure between 0 and 1000 psi, wherein applying the vacuum, applying the isostatic pressure, and annealing are done sequentially and with no intermediate transitions to ambient temperature or pressure.

13. The method of claim 12, wherein each glass comprises S, Se, Te, Ga, GeAs, Sn, Sb, Ag, or any combination thereof.

14. The method of claim 12, wherein at least one glass comprises F, Cl, Br, I, or any combination thereof.

15. The method of claim 12, wherein a guide sleeve is used to constrain lateral movement of the stack of glasses.

16. The method of claim 12, wherein the vacuum is between 0.1 and 100 mTorr.

17. The method of claim 12, where the vacuum is held for between 10 seconds and 60 minutes.

18. The method of claim 12, wherein the isostatic pressure is between 1500 and 3000 psi.

19. The method of claim 12, wherein the isostatic pressure is held for between 5 and 60 minutes.

20. The method of claim 12, wherein the annealing is for a time between 20 minutes and 2 hours.

* * * * *